Jan. 25, 1966   J. MacMANUS   3,230,926
APPARATUS FOR DEPOSITING WHIPPED PRODUCTS ON CONFECTIONS
Filed July 19, 1965   5 Sheets-Sheet 1

Jan. 25, 1966  J. MacMANUS  3,230,926
APPARATUS FOR DEPOSITING WHIPPED PRODUCTS ON CONFECTIONS
Filed July 19, 1965  5 Sheets-Sheet 2

Jan. 25, 1966 J. MacMANUS 3,230,926
APPARATUS FOR DEPOSITING WHIPPED PRODUCTS ON CONFECTIONS
Filed July 19, 1965 5 Sheets-Sheet 4

United States Patent Office 3,230,926
Patented Jan. 25, 1966

3,230,926
APPARATUS FOR DEPOSITING WHIPPED
PRODUCTS ON CONFECTIONS
John MacManus, 143—16 22nd Road, Whitestone, N.Y.
Filed July 19, 1965, Ser. No. 473,113
22 Claims. (Cl. 118—24)

This is a continuation-in-part of application Serial No. 259,012 filed February 18, 1963.

This invention relates to apparatus for depositing whipped foam products and the like on cakes, pies, other bakery type confections, and other dessert foods.

Aerated emulsions, of which whipped cream is a familiar example, when employed as cake toppings, are in great demand by the customers who seek ready-to-eat commercial bakery goods, but however, these items are in short supply. This demand has not been satisfied by the commercial bakers, due to a number of factors including inadequate decorating machines, lack of uniformity of the output of such machines and particularly the lack of flexibility for making multiple varieties on such machines as were heretofore available, spoilage in the application of the aerated cake toppings, and the current high and continuously increasing labor cost of skilled craftsmen.

When a whipped topping is so highly aerated as to have an overrun value of about 120%, for example, it has never been possible with the equipment heretofore available to mechanically deposit interchangeably and with such perfection the foamed product through multiple and/or single nozzles and for flexible tubes on a satisfactory commercial basis. This method and machine provides the proper tool for the first time.

Deterioration in the texture of the whipped product and reduction of the volume ratio of the air to the liquid and irregularity in the deposits have been common faults. Resort to hand methods of decorating has become too costly for economical commercial operations, because of the shortage of able craftsmen and the high cost of such personnel. Thus, the great sales potential of whipped topping goods has never been realized, and the consumer desire for low cost desserts and the like has not been satisfied by the commercial baker. This invention with its combination, as later described, completely eliminates the problems above mentioned and provides the foolproof means for making substantial profit by meeting customer needs.

To cater to this demand at a pice which will be readily acceptable to the consumers yet profitable to the baker, the latter has long needed a versatile decorating machine of small physical dimensions and low initial cost which can receive a highly aerated whipped emulsion of uniform texture and, without any substantial loss of volume or alteration of the texture of the emulsion, deposit efficiently and rapidly selected uniform designs upon a succession of cakes. For the successful display and sale of large numbers of such bakery goods, uniformity is an essential. The machine of this invention makes possible the attainment and assurance of such uniformity.

The general object of this invention is to provide a new combination in an improved confection decorating and tubing apparatus adapted for efficiently depositing on cakes and the like, whipped and the like products in an easily controlled uniform manner with great perfection of design which can be varied easily and yet the machine is low in cost and small in dimensions.

A particular object of the invention is to provide an apparatus which can handle and deposit highly aerated foam products without any substantial diminution in the volume thereof or lessening of the air to liquid ratio.

Another object is to provide cake decorating apparatus so designed and constructed that it can be operated with uniform and consistent success by an employee having less decorating skill than has been heretofore required for conventional hand decorating methods.

Still another object of this invention is to provide a new and useful apparatus for dispensing whipped products and which apparatus has a wide range of versatility as to speed of dispensing and amount of product dispensed.

Yet another object is to provide an apparatus in accordance with the foregoing object and which has controls which are quickly and easily varied.

It is another object of this invention to provide a unique apparatus in accordance with the foregoing objects and which includes a wide variety of dispensing heads adaptable to accommodate varying decorating needs and uses.

This invention provides the means for maintaining the highest standards of sanitation and provides ease of assembly and disassembly for cleaning and sterilization thereby eliminating the current unsanitary methods which are now used even by skilled craftsmen.

Other objects and advantages of the invention will be mentioned hereinafter or will become apparent from a perusal of the following specification, in which a preferred embodiment of the invention is shown and described, as illustrated in the nature of the invention.

Referring now to the drawings.

FIG. 16A illustrates a multiple nozzle decorating head attached to the hose of the apparatus of FIG. 16 and in use to deposit topping on a plurality of confections.

FIG. 16B is a fragmentary view, partly in section, showing an alternate hose construction from that of FIG. 16.

Figures 1, 2, 3, 4:
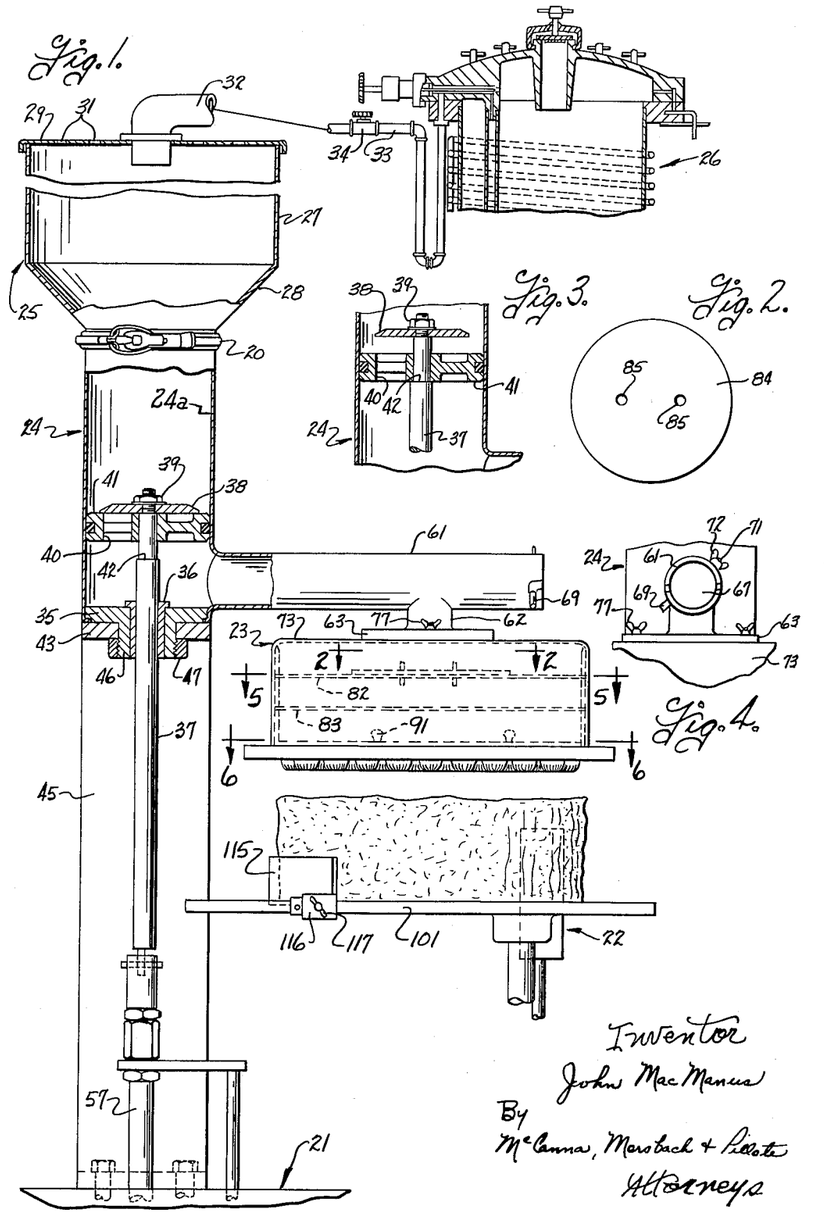
FIGURE 1 is a side elevational view, with some parts in section, showing a portion of the apparatus of the invention, and its association with a whipping apparatus.
FIG. 2 is a plan view of a deflector used in the decorator head, elsewhere shown in FIG. 10.
FIG. 3 is a sectional view of a pump piston.
FIG. 4 is a detail showing the end of the horizontal pipe which delivers foam products to the decorator head.
Figure 7:
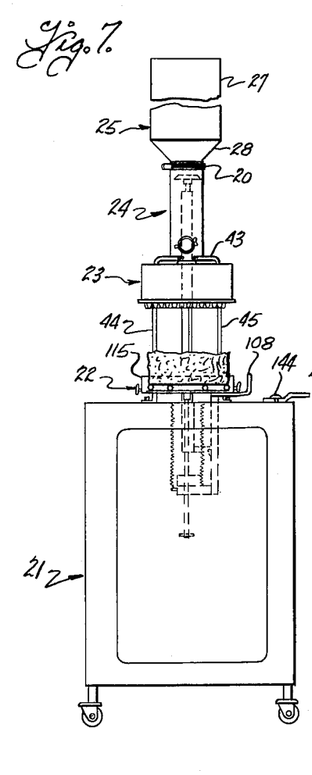
FIG. 7 is a front elevational view of the decorating apparatus, showing a cake positioned on the elevator, but omitting the whipping apparatus.

Referring first to FIGS. 1 and 7, the apparatus includes a base cabinet 21, a cake platform generally indicated as 22, a fixed decorating head indicated as 23, a pump 24, a hopper generally indicated as 25, and a preferred form of whipping apparatus generally indicated as 26, which may be connected with the decorating apparatus. The hopper is mounted on the cylinder as by clamp 20 for easy cleaning and to enable hoppers of varying heights to be used. The whipping apparatus 26 only partially shown herein, is fully shown and described in my copending application, Serial No. 226,557, filed September 27, 1962, on an invention entitled "Whipping Apparatus."

It is preferred that the greater portion of the total vertical and sloping height of the hopper 25 be in the vertical cylindrical portion 27, and that the tapered portion 28 be steeply inclined as it connects the hopper to the vertical pump cylinder 24a. The top of the hopper may be closed by a cover plate 29 (FIG. 1) having openings or perforations 31, for the escape of air which might be released in the hopper from the prewhipped topping. The topping is introduced through the feed tube 32, which is connected with tube 33 leading from the whipping apparatus 26. Because of a considerable difference in the drawing scale showing the hopper and showing the apparatus 26, tubes 32 and 33 are here shown on different scales but actually are of the same size. A shut off valve 34 may be provided in pipe 33.

The whipping apparatus 26 shown partially in FIG. 1, delivers its highly aerated foam product directly to the hopper 25 as the aerated whippable material is produced. It is desirable that such immediate delivery be made, and the decorating apparatus is well adapted to receive and dispense this newly made foam product. When the prewhipped topping is made by impregnating the whippable material in a closed container under air pressure with millions of tiny air cells, as when made as described in my aforesaid coending application in the apparatus 26, a foamy product of 120% and much higher overrun can easily be produced. Such a product can be stable for long periods and free from "weeping" and while it has a very desirable fine texture and high air content, these factors produce some problems in its usage. Unavoidably, there will be some unstable large pockets of air trapped by the product along with the much greater proportion of fine, stable air bubbles impregnated in the product. These pockets are expanded in the hopper 25 and will free themselves in the enlarged space of the hopper and directly escape from the hopper through perforations 31. Therefore, there will be no unwanted sudden blasts or explosions of large pockets at the decorator nozzles or flexible hoses, such as might splatter the foam product in all directions. The cylindrical column of foam product in the pump 24 either above or below the piston 41 will be free from air pockets, and on the suction stroke will be drawn downwardly in a uniform manner. Thus, it can be seen that were the air pockets not removed, some of them would interfere with the uniformity of the later deposited topping.

The foamy texture and low specific gravity of the mass of foam also make the product unsuitable to feed merely by gravity from a conventional conical hopper. I have found, however, that if the vertical height of the conical section 28 of the hopper be considerably less than the height of the superposed vertical cylindrical section 27, the foamy mass will feed downwardly uniformly into the pump cylinder under the action of gravity, atmospheric pressure and the pump suction. Hence, no mechanical agitators are needed for expelling the product with such attendant destruction of its texture and loss of volume as may well result.

The construction of the hopper 25 while not essential to all features of the invention contributes greatly to efficient operation, provides improved sanitation, and helps prevent cripples, i.e. products with minimized sales value. One serious problem in the use of conventional hoppers in such a combination is that of obtaining uniform feed of the material through the hopper and preventing the formation of a vortex so that a part of the material clings along the side of the hopper. It should be noted that this problem is severe because of the nature of whipped or foam products which do not flow readily. This action is objectionable for a number of reasons, one being that when the continuity of the flow through the hopper is disturbed, then the decorating head does not operate efficiently and the cripple rates are increased, also the product is perishable and tends to alter its characteristics when it clings for extended periods of time along the walls of the hopper. Furthermore, when so disposed it is in contact with the surrounding air where it is apt to become contaminated. To avoid this action and to obtain additional advantages the hopper 25 is so constructed that the side walls 27 in their upper portions are vertical. The hopper is arranged to have a diameter in the region of twice the diameter of its outlet and of the inlet to the pump 24 presently to be described. Furthermore, in my new machine it is possible to maintain a relatively small volume of product in a relatively small hopper in order to minimize the waste of material when the system is initially put into operation. With my whipping apparatus such as shown in FIG. 1 for example, because of its design and the size of the hopper the so-called initial "liquid run off" can be kept in the region of one pound of product whereas in previously known and much more expensive machines, the liquid run off may be as much as one hundred pounds of product and occurs on each subsequent start up. This factor alone precludes the use of such equipment by most retail and small commercial bakeries.

The pump 24 is illustrated in the form of a reciprocating device, to be hereinafter described, contained in a pump cylinder 24a. This is one embodiment of the invention but it can be embodied in other specific constructions having similar principles.

The pump cylinder 24a is supported on and secured in any suitable manner to the horizontal section 43 of an inverted U-shaped bracket whose vertical legs 44 and 45 are bolted to the top of the cabinet 21. The cylinder base block 35 includes a flanged collar 46 extending through a suitable aperture in the bracket section 43 and a nut 47 may serve to clamp the cylinder base block on the supporting bracket. A cylinder base block 35 (FIG. 1) is secured as by welding at the bottom end of the pump cylinder 24a and, together with a suitable sealing sleeve 36, guides the piston rod 37. On the initiation of the upstroke of piston rod 37, the valve 38 secured to the top of the rod by nut 39 will rise relatively to piston 41, uncovering one or more ports 40 in the piston. When the annular shoulder 42 on the piston rod engages the underside of the piston, the latter will rise and the whipped product in the pump cylinder will flow through and below the piston. On a subsequent downstroke of the piston rod, valve 38 will close and carry the piston downwardly. On this downstroke the whipped product above the piston will follow by the combined action of gravity, atmospheric pressure and pump suction, but central channelling action in the hopper does not occur as the product level is lowered.

Figure 14:
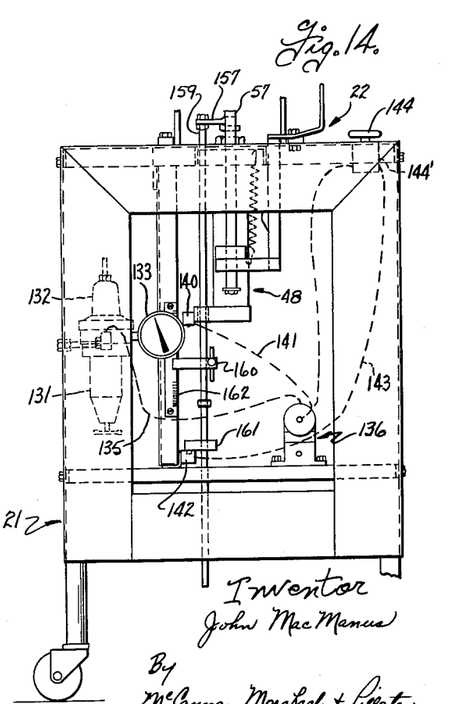
FIG. 14 is a view taken generally along broken line 14—14 of FIG. 13 and further showing the internal mechanism of the apparatus.

The pneumatic actuator or cylinder 48, best shown in FIG. 14, includes an air cylinder piston rod 57 which is connected to decorator piston rod 37 in any convenient manner (see FIG. 1). In this manner, the air cylinder 48 drives the decorator piston rod 37. The air cylinder may be of any conventional commercial construction if it functions substantially in the following or in a functionally equivalent manner. The air cylinder shown, for example, is a product of Bellows-Valvair of Akron, Ohio; known as their "power dome" model. It is contemplated that other types of actuators may be utilized; however, an air cylinder is preferred.

Figures 12, 13:
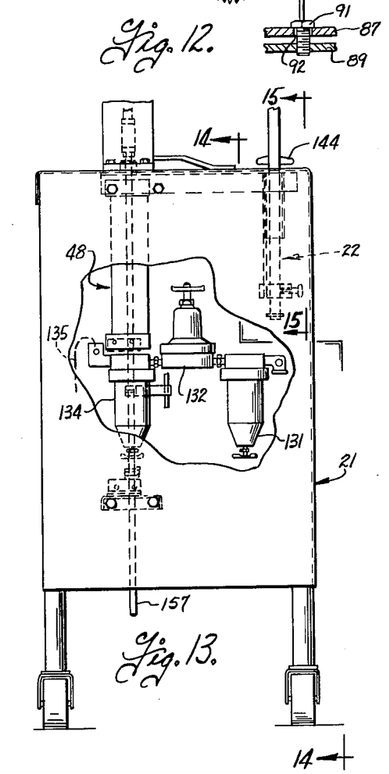
FIG. 12 is a detail in section on line 12—12 of FIG. 10.
FIG. 13 is a side elevational view of the base cabinet of the apparatus with a portion broken away to reveal the internal mechanism in greater detail.
Figure 17:
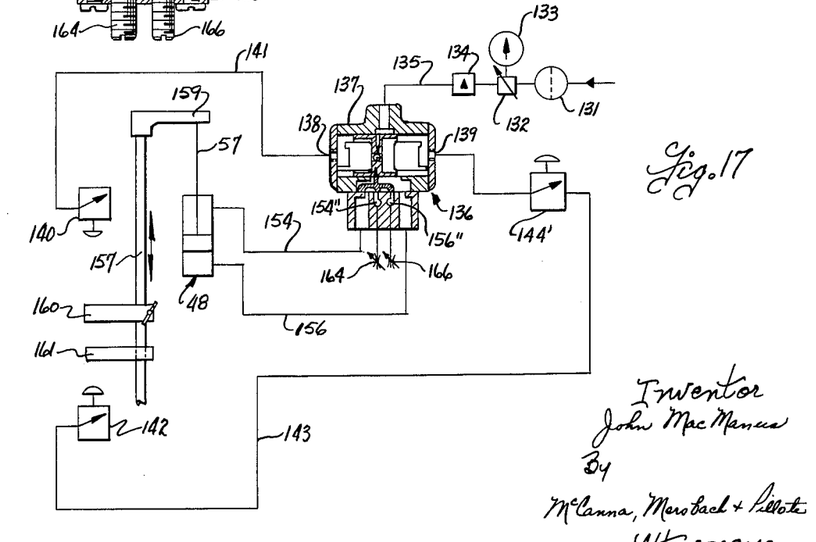
FIG. 17 is a diagrammatic illustration of the operating mechanism and controls of this invention.

When an air cylinder is used, air pressure from a remote source conveniently passes through air line filter 131, pressure regulator 132, and air line lubricator 134, which are shown in FIGS. 13 and 17. Pressure regulator 132 has a gauge 133 for determination of pressure. This combination assures a clean, accurately regulated air supply and proper lubrication of air cylinder 48 and any valves in the system.

Figures 18, 19, 20:
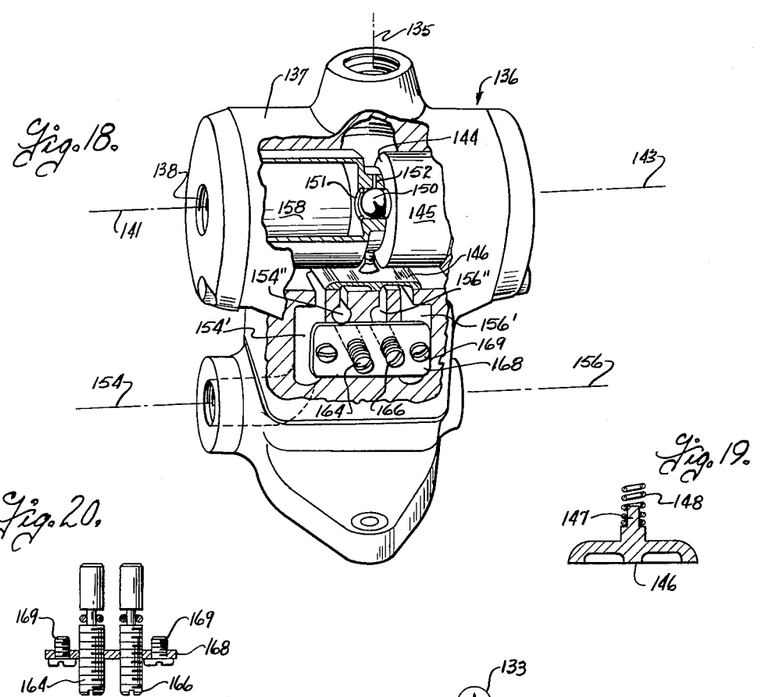
FIG. 18 is a perspective view of the pneumatic control valve with parts broken away to reveal its internal mechanism.
FIG. 19 is a sectional view of the slide valve assembly of the pneumatic control valve.
FIG. 20 is a sectional view of the independent speed controls which are mounted on the pneumatic control valve.

A salient feature of this invention is its versatility. In part, this is a function of the operating mechanism and controls which are diagrammatically illustrated in FIG. 17. The mechanism is preferably, but not necessarily, pneumatically operated. As shown, air pressure from a remote source is supplied through conduit 135 to a pneumatic control valve, generally designated by the numeral 136, which operates to alternately feed air through conduits 154 and 156 to opposite ends of air cylinder 48. The control valve illustrated in FIG. 18, for example, is a product of Bellows-Valvair of Akron, Ohio; known as their "air-poppet valve," model AP–5B. The control valve 136 may be mounted in any position for convenience of operation; however, the manufacturer recommends that distances greater than ten feet from the air cylinder not be utilized. The control valve is a four-way valve, preferably controlled and operated by pneumatic power. For this purpose, ports 138 and 139 are provided at each end of the valve body 137 and are conveniently tapped to accommodate a pipe fitting. A conduit 141 is used to connect a small, normally closed two-way valve 140 to port 138. Similarly, two-way valve 142 is connected to port 139 by conduit 143. Opening either two-way valve connected to the respective port bleeds a small amount of air from the control valve. The corresponding drop in pressure at that end of the valve allows an internal piston 145 (see FIG. 18) to shift in that direction and move a four-way slide valve 146 to which it is engaged. As best illustrated in FIG. 19, a spring 148 is conveniently disposed over an extension 147 of the slide valve and fits into a groove 144 in the internal valve 145. Once shifted, the piston remains in that position until the second two-way valve is opened to bleed air from the opposite port of the control valve. Only a momentary opening of the appropriate two-way valve is needed to shift the piston. The minimum time required is different for each operating condition and is influenced by the length of control lines, air pressure, and the type of two-way valve used. In general, however, this interval will be somewhere between one-sixth and one-tenth of a second.

As stated above, the two-way valves 140 and 142 trigger the action of the slide valve 146. Referring now to FIG. 18, the manner in which this occurs will be described in greater detail. As illustrated, the left portion of the control valve has had a small amount of air bled from it by a momentary opening in two-way valve 140. This momentary opening has permitted sufficient air to escape to reduce the normal air pressure in the left hand end of the piston 145 and cause a ball check 150 to move toward its left hand seat 151. The ball check will now allow high pressure air to enter the right hand end of the piston through an air passage 152 extending from groove 144 to the ball check housing and through the space between the ball check and the right hand seat. The full capacity of the high pressure air entering the right hand end of the piston 145 will completely seat the ball check 150 in its left seat thereby preventing high pressure air from entering the left hand cavity and will then drive the piston to the left to its alternate position. In so doing, the piston moves the engaged slide valve 146 and thereby reverses the direction of high pressure air to the air cylinder. As illustrated in FIG. 18, high pressure air flowing through conduit 135 was directed through channel 154' to conduit 154 immediately before the bleeding of air from two-way valve 140. As the piston 145 moves to the left, sliding valve 146 will slide to the left, blocking flow to channel 154' and directing the flow to channel 156' and conduit 156. As the piston moves to the left, the ball check 150 is engaged by an inner shell 158 and is forced off its seat when it moves against the shell. The incoming air pressure immediately enters the left hand cavity, repressurizes the drain side of the valve, and cushions the action of the moving piston at the same time. The valve piston remains in this position until the opposite two-way valve is momentarily opened, again upsetting the air pressure balance and reversing the valve action. The quick acting ball check arrangement permits the valve to be operated quite rapidly, for example as many as twenty cycles per second.

Figure 8:
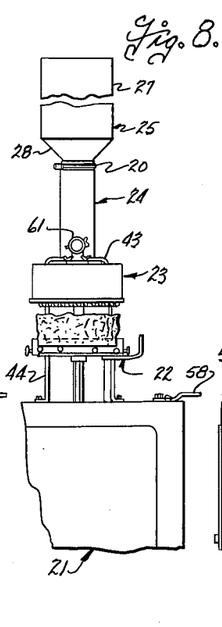
FIG. 8 is a front elevational view of the apparatus, showing a cake elevated to normal position for receiving the whipped product.
Figure 9:
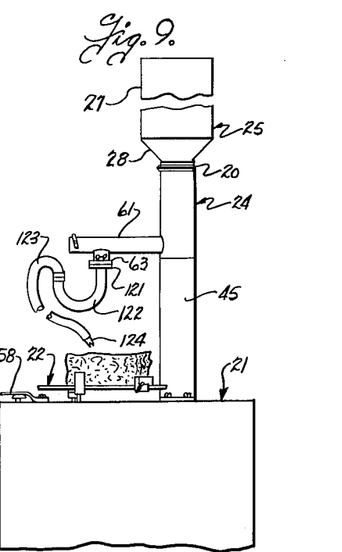
FIG. 9 is a side elevational view of the apparatus, modified by removal of the multiple nozzle decorating head and by the substitution of a single flexible hose for a manual decorating operation.

A manually operated air valve button 144 is mounted on the top of cabinet 21 as best shown in FIG. 14. When it is depressed, its associated valve 144' will open to start an operating cycle of the control valve 136. As the piston of the air cylinder rises, piston rod 57 and rod 157 attached to it by arm 159 will also rise. Rod 157 has an adjustable stop lug 160 and a fixed stop lug 161 mounted thereon, as best shown in FIGS. 14 and 17. As rod 157 rises, adjustable stop lug 160 will engage two-way valve 140 and reverse the flow of air to the cylinder as explained above. The piston of the air cylinder will then reverse direction and rod 159 will be lowered to the point of beginning where fixed stop lug 161 engages two-way valve 142. It is contemplated that fixed stop lug 161 may also be adjustable; however, such is not required. From the above description, it can be seen that a single punch on button 144 will cause the apparatus to operate through a full cycle and return to a rest position. A pivoted hold down lever 58, as shown in FIGS. 8 and 9, may be employed at will to hold down button 144, if repeated pump operation is desired for a period of time, to create continuous cycling or substantially continuous flow of the product. This is a desirable feature of the invention because when button 144 is retained closed, the rapid speed of the pump, which may be adjusted from one to three hundred fifty strokes per minute, together with the adjustable range of deposit of each stroke, which can be varied from one-sixteenth ounce to eight ounces or more per stroke, enables the production of a wide variety of products with the greatest simplicity of change over. Ordinarily, one downstroke of the product piston 41 will expel through the decorator head or tube enough whipped product to decorate a single cake.

By the simple act of resetting the adjustable stop lug 160 up or down, the length of the stroke of the air piston rod 57 and the product piston rod 37 may be increased or decreased respectively, thus to vary the amount of whipped product delivered to the decorator head on each downstroke. To this end, a scale 162 is provided inside cabinet 21, as shown in FIG. 14, and is conveniently calibrated for the amount of product to be dispensed by each stroke. In this manner, great accuracy in weight control is possible.

It was indicated above that the speed of the apparatus may be adjusted in the range from one to three hundred fifty strokes per minute. This is accomplished by controlling the exhaust of air from the air cylinder 48. As diagrammatically illustrated in FIG. 17, when air is directed to the air cylinder through conduit 156, for example, the air from the other side of the air cylinder is returned through conduit 154 to exhaust port 154'' which is communicating therewith by means of the slide valve 146. Similarly, there is an exhaust port 156'' for conduit 156. Flow controllers 164 and 166 communicate with exhaust ports 154'' and 156'' respectively, and are illustrated in greater detail in FIGS. 18 and 20. As best illustrated in FIG. 18, these flow controllers are mounted on valve 136 by means of plate 168 and fasteners 169. By having two exhaust ports, and individual controls, the speed of the piston of the air cylinder 48 can be controlled in either direction. As can be seen in FIGS. 18 and 20, the flow controllers are conveniently screw-type adjustments which can be quickly and easily adjusted. In this manner, the air cylinder has a wide range of speed control of the piston, for example, out-fast, back-slow; or out-slow, back-fast; or generally balanced speed.

As shown in FIG. 1, a horizontal pipe 61 is welded to the pump cylinder 24a and from this pipe a short tube 62 depends, carrying a rigid circular plate 63 from which the decorating head is supported. A plug 67, carrying a compressible sealing ring 68, may be secured in the end of the pipe 61 in any suitable manner, such as by engaging protruding pins 69 and 71 in bayonet slots formed in the pipe end (see FIG. 4). For added security the end of one of the pins may be threaded and a nut 72 applied thereto to clamp the plug against accidental release.

Figures 10, 11:
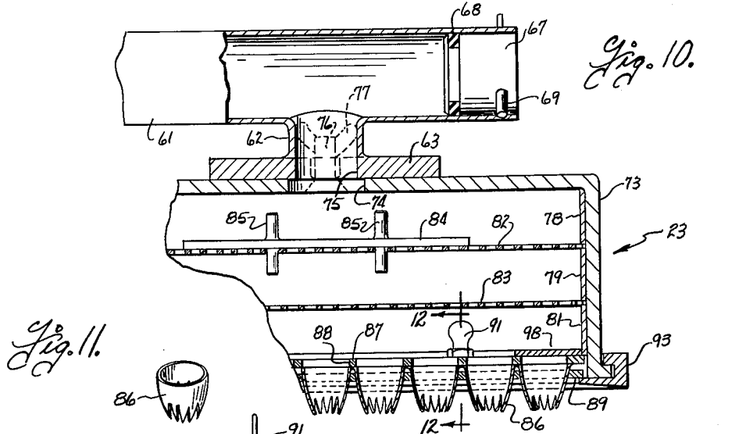
FIG. 10 is a detail in section of portions of the decorating head and its supply tube.
FIG. 11 is a perspective view of a decorating nozzle.

The decorating head includes the inverted pan or casing 73 whose top wall has an aperture or inlet part 74 registering with aperture 75 in plate 63 and with the tube 62, as illustrated in FIG. 10. This pan may be detachably secured to plate 63 by means of studs such as 76 and wing nuts 77. The casing 73 is provided with three annular spacing rings 78, 79, and 81 to facilitate the mounting of transverse screens 82 and 83 which, with the imperforate deflector plate 84 whose locating pins 85 pierce the upper screen, serve to divert and equalize the flow of whipped product from tube 62 to the nozzles.

Figure 5:
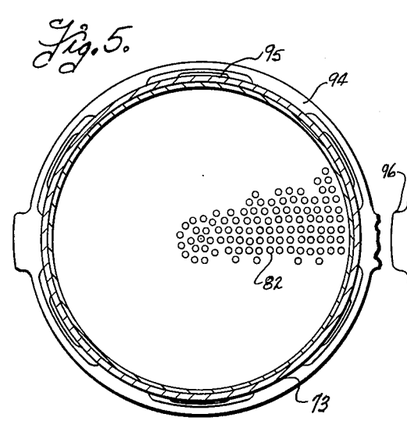
FIG. 5 is a sectional view on line 5—5 of FIG. 1.
Figure 6:
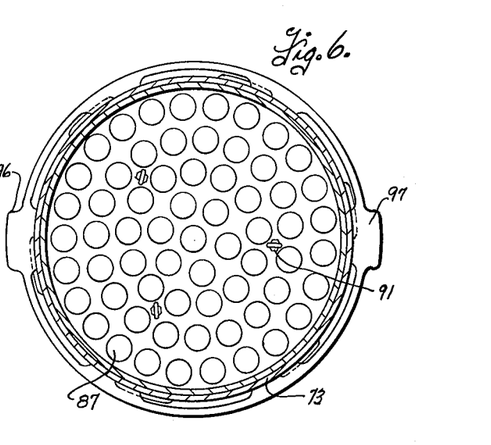
FIG. 6 is a sectional view on line 6—6 of FIG. 1.

As this food handling apparatus must be adapted for quick dismantling for frequent cleaning, it will be noted that even the tapered nozzles 86 are individual units and are held in the casing by a pair of removable plates. The upper plate 87 has apertures 88 spaced for registration with the nozzles but of lesser diameter than the diameters of the inlet ends of the nozzles, as shown in FIG. 10. Thus, the margins of apertures 88 engage and can be clamped down on the upper edges of the nozzles. The lower plate 89 is also pierced by apertures as shown, each to be engaged by the side wall of a nozzle. This pair of plates can be assembled with all nozzles in place outside of the casing and the plates may be locked together, clamping the nozzles as shown, by inserting a few thumb screws such as 91 (see FIG. 12) through suitable apertures 92 in the upper plate and threading the screws into suitable threaded holes in bottom plate 89. After such outside assembling, the assembly of plates and nozzles may be inserted into the casing against spacer ring 81 and then clamped securely in place by the clamping ring 93 which has peripherally spaced apart inwardly extending flanges 94 which, as seen in FIG. 5, can be pushed up past the level of outwardly extending peripherally spaced lugs 95 on the casing 73. Thereafter, a slight rotation of the clamping ring 93 will effect a locking reaction between the flanges and lugs, effectively clamping the nozzles and plates 87 and 89 in the casing. The projections 96 and 97 on the clamping ring are provide for convenience in gripping and rotating the ring. The entire decorator head assembly after cleaning may be re-assembled upside down and then re-attached to plate 63.

The annular horizontal ring 98 shown partly in FIG. 10 is illustrative of a means for covering or blanking out one or more outside or inside annular rows of nozzles when it is desired to prevent the discharge of topping through such nozzles. Rings of various annular widths may be employed especially to accommodate the decorator head to cakes of various diameters. While it is contemplated that various materials may be utilized, it has been found that neoprene is a suitable material for the rings. The use of these rings allows one decorating head to serve for many of various sizes thus effectuating considerable savings in cost.

It should also be noted that bottom decorating plates having different patterns of openings, different spacings, and different shaped nozzles can be easily and quickly changed to provide the decorating pattern. They, and the balance of the head, can be quickly disconnected for cleaning and sterilization and because of the smooth configuration of the parts, there are no interstices where material may resist cleaning.

Figures 15, 16:
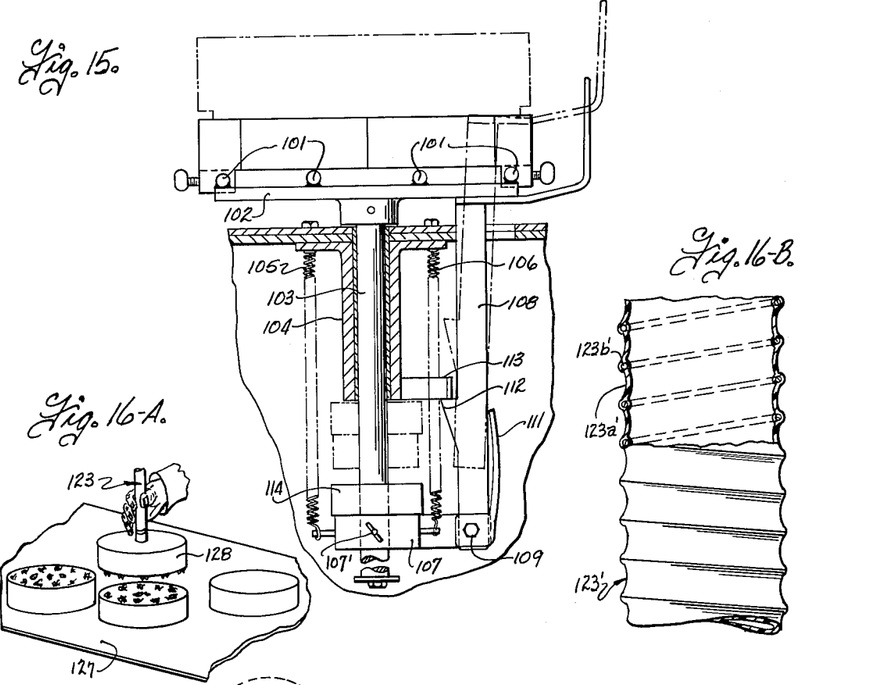
FIG. 15 is an elevational view of the cake elevator taken along line 15—15 of FIG. 13.
FIG. 16 illustrates in greater detail the apparatus modified as in FIG. 9 and in use to deposit topping on a plurality of confections.
Figure 16:
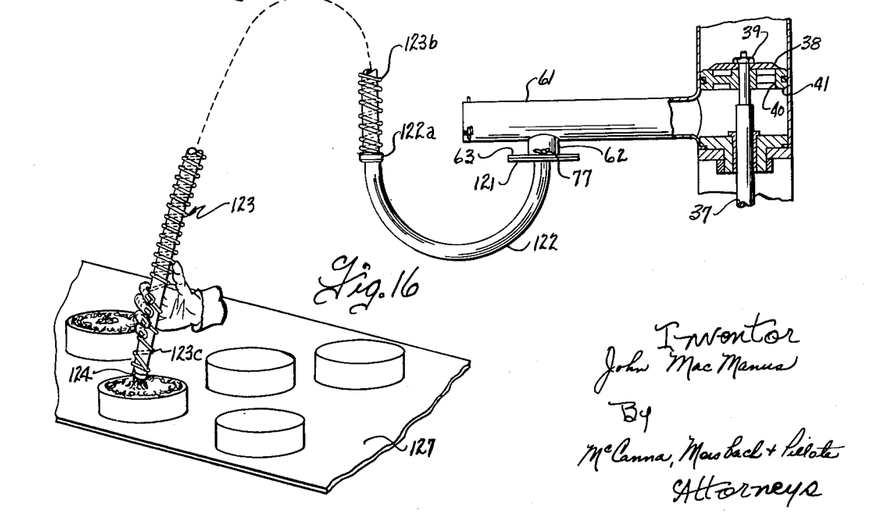

Referring now to the cake platform generally indicated as 22 in FIG. 7, the platform may consist of an assembly, as in FIG. 15, of spaced horizontal rods 101 welded to a transverse bar 102 which is affixed in any suitable manner to the top of a vertically reciprocable shaft 103 slidable in a sleeve 104 and biased to rise normally by the action of springs 105 and 106 connected as shown to the frame and to the shaft by means of plate 107. The plate 107 may be adjusted vertically on shaft 103 by means of a conventional thumb set screw 107'. Thus the extent of elevation of the cake platform may be varied.

A manual lever 108 pivoted at 109 is biased by spring 111 to cause the latch 112 to engage the fixed projection 113 on sleeve 104, thus to hold the cake platform in lower position. When the latch is manually disengaged, the springs will elevate the platform and present the top of the cake at the proper level beneath the nozzles. A rubber bumper 114, may be positioned on the shaft above the plate 107 fixed on shaft 103 to cushion the rise of the cake platform.

An adjustable back stop for a cake when positioned on the platform consists of a curved metal strip 115, secured at its opposite ends to sleeves 116 slidably adjustable horizontally on the platform rods 101, as best seen in FIG. 1. The sleeves may be clamped by thumb screws 117.

Another feature of the versatility of this invention is the plurality of decorator nozzles which are included therein. FIGURES 9 and 16 illustrate how simple it is to remove the multiple nozzle cake decorator head 23 from plate 63 and clamp to that plate another plate 121 conveniently carrying a curved pipe 122. The inlet end of a flexible hose 123 is shown connected to pipe or conduit 122 by any suitable coupling as at 122a; or a plurality of hoses connected by manifold may be connected to the pipe. A single nozzle or tip 124, somewhat similar to nozzle 86 (FIG. 12), may be associated with the end of hose 123, as shown in FIGS. 9 and 16, other nozzle means to be employed in manually decorating a confection, as may be advisable for special occasions. During such a manual operation, the air valve button hold down lever 58 may be used to provide continuing pumping of the foam product, if desired. For this purpose, the speed controls may be set for generally slow pumping action, with fast return of the cylinder to start the next cycle. As can be seen in FIG. 16, the apparatus described above may be utilized to decorate a series of individual confections on a tray or other support 127.

A multiple nozzle decorating head 128 is illustrated attached to the end of flexible hose 123 in FIG. 16–A. The decorating head 128 illustrated is similar in construction head 23, but of a smaller size, preferably having a size approximating the area of the surface to be decorated. It should be obvious, therefore, that various sized heads can be used. For this purpose, the piston stroke of the air cylinder is advantageously set to dispense the desired amount for each cycle. The speed controls may be set so that there is a sufficient period of time between each dispensing of foam product to allow the workman to move to the next confection. Since the preferred embodiment of the present invention has a reciprocal pumping action, a certain amount of sound is emitted by the same and by the discharge of air from the air cylinder 48. By synchronizing himself with the machine, a workman can have the nozzle 128 in exact position when the foam product is discharged. In this way, a large number of confections can be decorated in a generally rapid manner with a minimum of fatigue.

Hose or conduit 123 may be made from many different materials and, as shown in FIG. 16, is preferably in the form of a relatively thin tube 123a of suitable disposable material which is surrounded by a helix of flexible wire 123b to prevent kinking and to support the thin tube yet permit maximum flexibility with minimum weight. This combination provides a tube having considerable strength and permits a maximum of maneuverability. The tube is easily inserted into the helix for connection as to coupling 122a, and is easily removed for disposal after use. Preferably, therefore, the tube is construed of a low-cost synthetic resin and thin walled polyethylene has been found eminently suitable for this purpose. While it is contemplated that the flexible wire may be of various materials of various sizes, it has been found that 3/32" diameter stainless steel wire having a helical pitch of 1/2" is suitable for this purpose. Preferably the helix is expanded or spread as shown at 123c to provide access of fingers to the tubing 123a. In this manner, the tubing may be manually collapsed to terminate flow therethrough and provide further control by the operator, if desired. While the length and size of the conduit or hose will vary according to usage and the desired output, a length of about 12" to 48", and an inside diameter of 1/2" to 1 1/4" generally performs adequately over a wide range of complex and diversified uses in the food industry. The length of hose 123 will, of course, be sufficient to extend from its attached end, as to pipe 122, to the site of the decorating operation. This flexible hose allows the operator to freely move the nozzle or decorating head from one confection to another. Preferably, pipe 122 terminates with a length adjacent its outlet end extending upwardly. In this manner, hose 123 attached thereto is supported with its inlet portion extending upwardly. This aids in supporting the flexible length at a level above the work area. The intermediate portion of hose may be supported by a sling to the ceiling (not shown) or other suspension means, or carried on the shoulder of the operator.

An alternate hose construction is shown in FIG. 16–B and includes a relatively thin tube 123a' of suitable synthetic resin in which is embedded a helix of flexible wire 123b' to support the thin tube.

In place of a vertically reciprocable cake holding platform 22, or a tray 127, there may be used a conveyor for moving a succession of cakes under the decorator head 23, and detaining them there momentarily to receive toppings. A conveyor may also be used with the apparatus of FIGS. 16 or 16–A and, if advanced at the proper slow speed, may be a continuously moving conveyor.

It should be understood that while a preferred embodiment of the invention is shown and described herein to illustrate the invention, modifications and variations of the invention may be employed without departing from the principles and scope of the invention defined in the appended claims.

I claim:

1. In a confection decorating apparatus, a hopper for receiving an aerated foam product having a centrally disposed outlet port at the bottom thereof, a decorator head having a top inlet port, a pump arranged to pump said foam product from said outlet port to said inlet port under slight pressure, a dispersing baffle below said inlet port, a bottom plate having spaced nozzle apertures therein, a nozzle supported in and depending below each aperture, an aperture nozzle clamping plate having openings therein positioned for registration with each nozzle and their margins engaged with the top edges of the nozzles, means for securing the clamping plate in operative position, and finely perforated product dispersing means between said baffle and said clamping plate.

2. In a confection decorating apparatus, a tubular hopper having a relatively elongated vertical side wall, an inwardly tapered wall section depending therebelow and an outlet port at the bottom of the tapered section, means for introducing an aerated foam product into the hopper above the product level therein, means for relieving to atmosphere such air pockets as escape from the foam product in the hopper, a decorator head having a top inlet port, a dispersing baffle below said inlet port, a bottom plate having spaced nozzle apertures therein, a nozzle supported in and depending below each aperture, an apertured nozzle clamping plate having openings therein positioned for registration with each nozzle and their margins engaged with the top edges of the nozzles, means for securing the clamping plate in operative position, finely perforated product dispersing means between said baffle and said clamping plate, and means including ducts connecting the hopper outlet and decorator head inlet adapted to deliver the aerated foam product from the hopper into said head.

3. In a confection decorating apparatus, a tubular hopper having a relatively elongated vertical side wall, an inwardly tapered wall section depending therebelow and an outlet port at the bottom of the tapered section, means for introducing an aerated foam product into the hopper above the product level therein for release to atmosphere of such air pockets as escape from the product in the hopper, a decorator head having a top inlet port, a dispersing baffle below said inlet port, a bottom plate having spaced nozzle apertures therein, a nozzle supported in and depending below each aperture, an apertured nozzle clamping plate having openings therein positioned for registration with each nozzle and their margins engaged with the top edges of the nozzles, means for securing the clamping plate in operative position, finely perforated product dispersing means between said baffle and said clamping plate, and means including ducts connecting the hopper outlet and decorator head inlet adapted to deliver the aerated foam product from the hopper into said head.

4. In a confection decorating apparatus, a vertical cylindrical hopper having a relatively elongated vertical side wall, a relatively short conical hopper section depending from the cylindrical section and an outlet port at its lower end, means for delivering to the upper portion of the hopper a stream of aerated foam product, the upper portion of the hopper having an outlet for escape to the atmosphere of gas released by the foam product within the hopper, a confection decorator head having a plurality of depending nozzles, and means for pumping the foam product from the hopper to said head including a pump cylinder vertically below said port and communicating therewith, a vertically reciprocable piston in said cylinder having a valve in its top wall, duct means connecting the cylinder below the piston with said head, a piston rod connected to said valve adapted to unseat the valve upwardly on the pump upstroke and to close the valve on the downstroke.

5. In a confection decorating apparatus, a vertical cylindrical hopper having a relatively elongated vertical side wall, a relatively short conical hopper section depending from the vertical side wall and having an outlet port at its lower end, means for delivering to the upper portion of the hopper a stream of aerated foam product, the upper portion of the hopper having an outlet for escape to the atmosphere of gas released by the foam product within the hopper, at least one confection decorating nozzle means, and means for pumping the foam product from the bottom of the hopper to said nozzle means including a pump cylinder below and communicating with said port, a reciprocable piston in said cylinder having a valve adapted to open on the upstroke of the piston and close on the downstroke thereof, duct means connecting the cylinder below the piston with said nozzle means, means for driving said piston through dispensing strokes to dispense a substantially uniform amount of foam product on each stroke, a manually operated energizing means movable to an energizing position, and control means for controlling the driving means to drive the piston through dispensing strokes upon actuation of the manually operated means.

6. The combination of claim 5 including means for adjusting the length of the piston stroke to dispense a quantity of foam product within the range of about 1/16 to 8 ounces of product, and for adjusting the number of piston strokes within the range of between one and 350 strokes per minute.

7. In a confection decorating apparatus, a hopper having a major section of vertical tubular form for receiving an aerated foam product, an inwardly tapered bottom section of the hopper depending from said major section and having a bottom outlet, a pump cylinder connected with said outlet and depending vertically therefrom, a vertically reciprocable piston in said cylinder having a valve in its top wall, a downwardly extending vertically reciprocable piston rod connected to said valve adapted to unseat the valve upwardly on the upstroke of the piston and having means for propelling the piston upwardly after the valve is unseated, the downstroke of the piston being adapted first to close said valve and then to propel the piston downwardly, a leak proof bearing at the bottom of the cylinder through which the rod reciprocates, means for reciprocating the piston rod, a confection decorator head having a plurality of nozzles depending therefrom, duct means connected laterally to the cylinder just above said bearing and to the top of said decorator head, and means for supporting a confection to be decorated.

8. In a confection decorating apparatus, a hopper for receiving a supply of an aerated foam product and having an outlet port at the bottom thereof, means for supplying the foam product to the hopper, pump means for pumping the foam product from the hopper and including a pump cylinder below and communicating with said outlet port, a confection decorating nozzle means and duct means connecting the nozzle means to the pump cylinder, and pneumatic actuator means for operating said pump means.

9. In a confection decorating apparatus, a hopper for receiving an aerated foam product and having an outlet port at the bottom thereof, a pump cylinder below and communicating with said outlet port, a nozzle means and duct means connecting the nozzle means to the pump cylinder, a movable wall reciprocal in said pump cylinder and having a valve means therein adapted to open on the upstroke of said wall and close on the downstroke for pumping the foam product to the nozzle means, a rod attached to said movable wall and extending downwardly to a point outside the pump cylinder, drive means attached to said rod for reciprocating the same, means for varying the length of stroke of said rod to thereby vary the quantity of foam product dispensed on each stroke, and means for varying the speed of reciprocation of the rod.

10. The combination of claim 9 wherein said duct means includes a generally rigid tubular member attached to said pump cylinder at a point below the lowest point of the movement of movable wall, a generally rigid U-shaped conduit attached to said tubular member at one end and having its other end extending generally upwardly, and a generally flexible member attached to said other end whereby the flexible member extends upwardly for a distance adjacent its inlet end and its outlet end is manually movable over a predetermined area.

11. The apparatus of claim 9 wherein said duct means includes a substantially rigid tubular member and wherein said confection decorating nozzle means includes a head attached to said tubular member and having a plurality of nozzles depending therefrom.

12. The apparatus of claim 9 wherein said duct means includes a substantially flexible tube and wherein said confection decorating nozzle means includes at least one nozzle attached adjacent to the outlet end of said tube.

13. In a confection decorating apparatus, a hopper for receiving an aerated foam product and having an outlet port at the bottom thereof, a pump cylinder below and communicating with said outlet port, nozzle means and duct means connecting the nozzle means to the pump cylinder, a movable wall reciprocal in said pump cylinder and arranged to pump the foam product to the nozzle means, a rod attached to said movable wall and extending outside the pump cylinder, drive means attached to said rod for reciprocating the same, first means for varying the speed of the stroke of said rod in one direction, and second means for varying the speed of the return stroke of said rod.

14. In a confection decorating apparatus, a hopper for receiving an aerated foam product and having an outlet port at the bottom thereof, a pump cylinder below and communicating with said outlet port, nozzle means and duct means connecting the nozzle means to the pump cylinder, a movable wall reciprocal in said pump cylinder and arranged to pump the foam product to the nozzle means, a rod attached to said movable wall and extending outside the pump cylinder, a pneumatic actuator attached to said rod, means for supplying air to opposite ends of the actuator for reciprocation thereof, valve means for controlling the flow of air to the actuator to move the rod through a single cycle including a stroke in one direction and a return stroke, first means for varying the speed of the stroke of said rod in one direction, and second means for varying the speed of the return stroke of said rod.

15. The apparatus of claim 14 including means manually settable for operating said valve means through successive cycles.

16. The apparatus of claim 14 including means for varying the length of the stroke of the rod to thereby vary the quantity of foam product dispensed with each cycle of the rod.

17. A confection decorating apparatus including, a tubular hopper for receiving an aerated foam product having a relatively elongated vertical side wall, an inwardly tapered wall section depending therebelow and an outlet port at the bottom of the tapered section, means for supplying the foam product to the hopper, means for relieving to atmosphere such air pockets as escape from the foam product in the hopper, a pump cylinder vertically below said hopper outlet port and communicating therewith, a nozzle means and duct means connecting the nozzle means to the pump cylinder, a vertically reciprocal wall in said pump cylinder and having a valve means therein for opening on the upstroke of said wall and for closing on the downstroke for pumping the foam product to the nozzle means, a rod connected to said wall and extending outside of said pump cylinder, a pneumatic actuator connected to said rod for driving the rod through a cycle consisting of an upstroke and a downstroke, conduit means connected to generally opposite ends of said actuator, a pneumatic valve connected to said conduit means, first and second pilot valves for alternately reversing said pneumatic valve and thereby control flow of air to opposite ends of the actuator to move the rod through said cycle, means connected to said rod for movement therewith and for engaging said pilot valves thereby actuating the same for reversing the pneumatic valve, means for changing the relative positions of said pilot valves and said last-mentioned means for varying the length of stroke of the rod and thereby vary the quantity of foam product dispensed, first valve means in the conduit means leading to one end of the actuator for controlling exhaust of air therefrom to control speed of the upstroke of the rod, second valve means in the conduit means leading to the other end of the actuator for controlling exhaust of air therefrom to control speed of the downstroke of the rod, a manually operated means movable to an energizing position for operating the actuator to drive the rod through said cycle, and means for retaining said manually operated means in energizing position for continuous operation of the actuator.

18. In a confection decoration apparatus, a nozzle-equipped decorator head comprising a tubular casing having a top wall and an inlet port in said wall, an imperforate deflector baffle positioned in the casing below said port, multi-apertured foam product dividing and dispersing means extending horizontally across the casing below said baffle, a plurality of individual decorator nozzles, and means in the casing adapted for laterally spacing and supporting said nozzles with their outlet ends depending.

19. In a confection decorating apparatus, a nozzle-equipped decorator head comprising a tubular casing having a top wall and an inlet port in said wall, multi-apertured foam product dividing and dispersing means extending horizontally across the inside of the casing, means for removably supporting said dispersing means above the bottom of the casing, a plurality of individual decorator nozzles, and means for laterally spacing and removably supporting said nozzles in the casing spaced downwardly from the dispersing means with the outlet ends of the nozzles depending.

20. In a confection decorating apparatus, a tubular hopper for receiving a supply of an aerated foam product and having a relatively elongated vertical side wall, an inwardly tapered wall section depending therebelow and an outlet port at the bottom of the tapered section, pump means communicating with said outlet port for pumping the foam product from the hopper and adapted for pumping the foam product in generally uniform pulsations, a confection decorating nozzle means and duct means connecting the nozzle means to the pump means, and means for controlling the pump means whereby the quantity dispensed from the nozzle means during each pulsation may be varied.

21. The combination of claim 20 wherein said duct means includes a flexible wire helix, a highly flexible thin walled tube disposed in the helix and supported thereby for carrying the product to the nozzle means, said helix being spread adjacent the nozzle means to provide access of fingers of an operator to collapse the tube and control flow to the nozzle means.

22. The combination of claim 21 wherein the thin walled tube is formed of synthetic resin and easily inserted and removed from the flexible wire helix for disposal of the tube after use.

References Cited by the Examiner
UNITED STATES PATENTS 1,654,538   1/1928   Ehrlich ___________ 118—24

CHARLES A. WILLMUTH, *Primary Examiner.*